US010324641B2

(12) United States Patent
Lu

(10) Patent No.: US 10,324,641 B2
(45) Date of Patent: Jun. 18, 2019

(54) SRAM-BASED AUTHENTICATION CIRCUIT

(71) Applicant: Taiwan Semiconductor Manufacturing Co., Ltd., Hsinchu (TW)

(72) Inventor: Shih-Lien Linus Lu, Hsinchu (TW)

(73) Assignee: Taiwan Semiconductor Manufacturing Co., Ltd., Hsin-Chu (TW)

(*) Notice: Subject to any disclaimer, the term of this patent is extended or adjusted under 35 U.S.C. 154(b) by 0 days.

(21) Appl. No.: 16/100,008

(22) Filed: Aug. 9, 2018

(65) Prior Publication Data

US 2018/0349050 A1 Dec. 6, 2018

Related U.S. Application Data

(63) Continuation of application No. 15/192,297, filed on Jun. 24, 2016, now Pat. No. 10,067,701.

(60) Provisional application No. 62/312,959, filed on Mar. 24, 2016.

(51) Int. Cl.
*G06F 3/06* (2006.01)
*G11C 11/41* (2006.01)
*G11C 11/419* (2006.01)
*H04L 9/32* (2006.01)
*H04L 9/08* (2006.01)

(52) U.S. Cl.
CPC .......... *G06F 3/0622* (2013.01); *G06F 3/0653* (2013.01); *G06F 3/0673* (2013.01); *G11C 11/41* (2013.01); *G11C 11/419* (2013.01); *H04L 9/0866* (2013.01); *H04L 9/3278* (2013.01); *H04L 2209/34* (2013.01)

(58) Field of Classification Search
CPC ............................ G11C 13/0059; G11C 16/05
USPC ................................ 365/185.04, 154, 185.09
See application file for complete search history.

(56) References Cited

U.S. PATENT DOCUMENTS

| 8,605,523 | B2 | 12/2013 | Tao et al. |
| 8,630,132 | B2 | 1/2014 | Cheng et al. |
| 8,760,948 | B2 | 6/2014 | Tao et al. |
| 8,908,421 | B2 | 12/2014 | Liaw |
| 8,929,160 | B2 | 1/2015 | Katoch et al. |
| 8,964,492 | B2 | 2/2015 | Hsu et al. |
| 8,982,643 | B2 | 3/2015 | Lum |
| 9,117,510 | B2 | 8/2015 | Yang et al. |
| 9,208,858 | B1 | 12/2015 | Lin et al. |
| 9,218,872 | B1 | 12/2015 | Liaw |
| 9,584,329 | B1 * | 2/2017 | Trimberger ........... H04L 9/3278 |
| 9,947,391 | B1 | 4/2018 | Mahatme |

(Continued)

*Primary Examiner* — Han Yang
(74) *Attorney, Agent, or Firm* — Duane Morris LLP

(57) ABSTRACT

An authentication circuit coupled to a plurality of memory bits includes a first circuit configured to provide a first data pattern to all the bits thereby causing each bit to be in a first data state, detect whether a transition from the first data state to a second data state occurs for each bit in response to a first reducing voltage applied to the plurality of bits, provide a second data pattern to all the bits thereby causing each bit to be in the second data state, and detect whether a transition from the second data state to the first data state occurs for each bit in response to a second reducing voltage applied to the plurality of bits, wherein the first data state is different from the second data state, and a second circuit configured to generate a PUF signature based on the transitions of each bit.

20 Claims, 7 Drawing Sheets

(56) References Cited

U.S. PATENT DOCUMENTS

| | | |
|---|---|---|
| 2014/0153345 A1 | 6/2014 | Kim et al. |
| 2014/0233330 A1 | 8/2014 | Ko et al. |
| 2015/0278551 A1 | 10/2015 | Iyer |
| 2015/0348598 A1 | 12/2015 | Wang et al. |
| 2015/0371702 A1 | 12/2015 | Wu et al. |
| 2015/0380077 A1 | 12/2015 | Wu et al. |
| 2015/0380078 A1 | 12/2015 | Liaw |
| 2017/0038807 A1 | 2/2017 | Bittlestone |

\* cited by examiner

US 10,324,641 B2

SRAM-BASED AUTHENTICATION CIRCUIT

CROSS-REFERENCE TO RELATED APPLICATION

The present application is a continuation of U.S. patent application Ser. No. 15/192,297, filed on Jun. 24, 2016, which claims priority to U.S. Provisional Patent Application No. 62/312,959, filed on Mar. 24, 2016, each of which is incorporated by reference herein in their entireties.

BACKGROUND

With the increasing use of electronic devices utilizing integrated circuits to provide different types of information for a variety of different applications, there has been an increasing need to adequately protect sensitive and/or critical information that may be stored within an electronic device to limit access to such information to only such other devices that have permission to access the information. Some examples of applications include the authentication of devices, protection of confidential information within a device, and securing a communication between two or more devices.

A physically unclonable function (PUF) is a physical structure generally within an integrated circuit that provides a number of corresponding outputs (e.g., responses) in response to inputs (e.g., challenges/requests) to the PUF. Each PUF provides one or more sets of request-response pairs. An identity of the integrated circuit may be established by such request-response pairs provided by the PUF. With the establishment of the identity, secure communication can be provided between devices. The PUF can also be used for existing authentication purposes to replace the current method of assigning an identity to an electronic device. Since the PUF is based on intrinsic properties of a manufacturing process, the PUF has various advantages over conventional authentication approaches that inscribes an identity on a device which may be mimicked and/or reverse engineered more easily.

BRIEF DESCRIPTION OF THE DRAWINGS

Aspects of the present disclosure are best understood from the following detailed description when read with the accompanying figures. It is noted that various features are not necessarily drawn to scale. In fact, the dimensions of the various features may be arbitrarily increased or reduced for clarity of discussion.

DETAILED DESCRIPTION OF EXEMPLARY EMBODIMENTS

Figure 1:
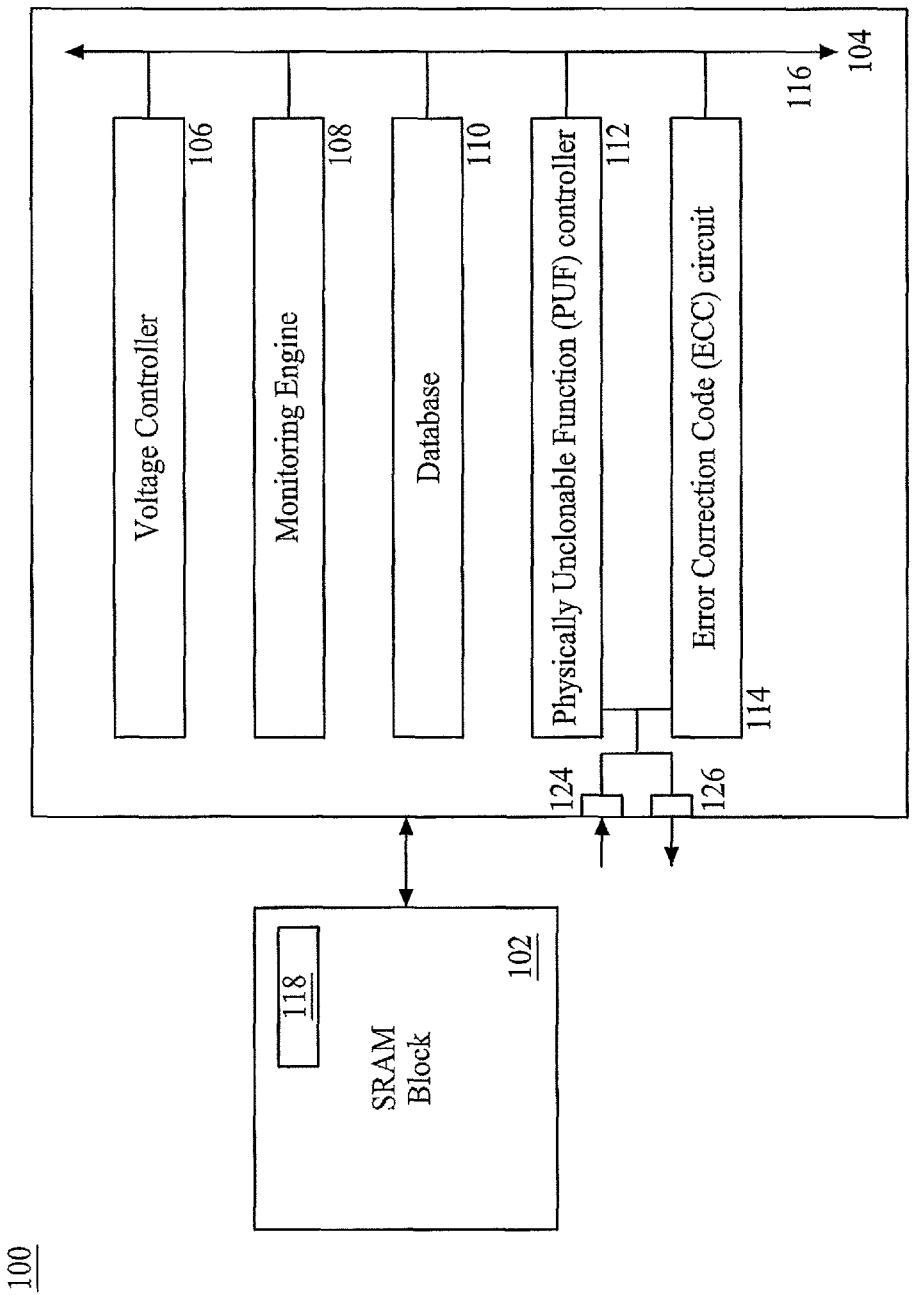
FIG. 1 illustrates an exemplary block diagram of a memory device that includes an authentication circuit in accordance with some embodiments.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

A physical unclonable function (PUF) is generally used for authentication and secret key storage without requiring secure electrically erasable programmable read-only memory (EEPROMs) and/or other expensive hardware (e.g., battery-backed static random-access memory). Instead of storing secrets in a digital memory, the PUF derives a secret from physical characteristics of an integrated circuit (IC). The PUF is based on an idea that even though an identical manufacturing process is used to fabricate a plurality of ICs, each IC may be slightly different due to manufacturing variability. PUFs leverage this variability to derive "secret" information that is unique to each of the ICs (e.g., a silicon "biometric"). Generally, such secret information is referred to as a "signature" of the IC. In addition, due to the manufacturing variability that defines the signature, one cannot manufacture two identical ICs even with full knowledge of the IC's design. Various types of variability of an IC can be used to define such a signature such as, for example, gate delay(s), threshold voltage(s), power-on state(s) of a static random-access memory (SRAM) device, and/or any of a variety of physical characteristics of an IC.

In the example of using the power-on state(s) of a static random-access memory (SRAM) device provided above, even though an SRAM device includes symmetric cells (bits), manufacturing variability may still cause each bit of the SRAM device to tend to be at a high state (i.e., logical "1") or at a low state (i.e., logical "0") while the SRAM device is powered on. Such initial power-on states of the bits are randomly distributed across the whole SRAM device, which gives rises to a variability that can be defined by a PUF to produce an unique signature of the SRAM device. Generally, generating a PUF signature by using the power-on state(s) of an SRAM device is referred to as a "power-on SRAM-based PUF." Such a conventional power-on SRAM-based PUF commonly requires a memory/database to record and store the initial power-on states for all the bits of the SRAM device. As the size of the SRAM device (i.e., the number of bits) trends to increase exponentially, the size or capacity of the memory/database needs to increase correspondingly, which may disadvantageously cause a variety of issues such as, for example, real estate in fabricating an SRAM device, power consumption to operate an SRAM device, etc.

Embodiments of the present disclosure provide various systems and methods to substantially reduce the number of bits that are to be used by a PUF to generate a signature by using a monitoring engine, which will be described in detail below. The substantial reduction of the number of bits may advantageously improve the variety of issues faced by the conventional PUFs (e.g., the power-on SRAM-based PUF). Moreover, the disclosed systems and methods in current embodiments provide a dynamic monitoring process on all the bits and thus may dynamically change (e.g., reducing) the number of bits that would be used by the PUF to generate a signature. Details of the dynamic monitoring process will be described below as well.

FIG. 1 illustrates a memory device 100 in accordance with various embodiments. In the illustrated embodiment of FIG. 1, the memory device 100 includes an SRAM block 102, and an authentication circuit 104 coupled to the SRAM block 102. Although the authentication circuit 104 is illustrated as a separate component from the SRAM block 102 in the illustrated embodiment of FIG. 1, in some embodiments, the authentication circuit 104 may be integrated or embedded in the SRAM block 102 while remaining within the scope of the present disclosure. According to some embodiments of the present disclosure, the authentication circuit 104 is configured to generate an unique PUF signature for the SRAM block 102 by monitoring a tendency of each bit of the SRAM block 102, which will be discussed in detail as follows.

In the illustrated embodiment of FIG. 1, the authentication circuit 104 includes a voltage controller 106, a monitoring engine 108, a database 110, a physically unclonable function (PUF) controller 112, and an error correction code (ECC) circuit 114 each coupled to each other through a data bus 116. According to some embodiments, the monitoring engine 108 may be referred to as a "BIST engine." In some embodiments, all the components of the authentication circuit 104 (i.e., the voltage controller 106, the monitoring engine 108, the database 110, the PUF controller 112, and the ECC circuit 114) may be coupled to a common data bus 116 for inter-communication. In some embodiments, the authentication circuit 104 includes an input port 124 and an output port 126. The input port 124 of authentication circuit 104 is configured to receive a request/challenge (e.g., a request to power on the coupled SRAM block 102, a request to access confidential information of the SRAM block 102, etc.). The output port 126 of the authentication circuit 104 is configured to provide a response (e.g., a PUF signature) in response to the request based on the monitored bits of the SRAM block 102. In some embodiments, such input and output ports may be directly coupled to the PUF controller 112. That is, in accordance with such embodiments, the PUF controller 112 is configured to receive a request through the input port 124 and provide a response through the output port 126. In some embodiments, the request and the corresponding response provided by the authentication circuit 104/the PUF controller 112 may be both stored as a request-response pair for further cryptographic use (e.g., a cryptographic key generation process).

Referring still to FIG. 1, in some embodiments, the database 110 includes a non-volatile memory (NVM) device, wherein the NVM device may include a plurality of cells. In some embodiments, each cell of the database 110 may include a single bit, but in some other embodiments, each cell of the database 110 may include two or more bits while remaining within the scope of the present disclosure. Each bit of the cell may be referred to as a "fuse." In an example, if the database 110 includes 10 cells and each cell has one bit, then the database 110 is referred to as having 10 bits of fuses.

In accordance, with some embodiments, the voltage controller 106 is configured to vary a voltage level supplied to the SRAM block 102. The monitoring engine 108 is configured to monitor and/or identify a tendency of each bit of the SRAM block 102. As described above, the database 110 may include an NVM device that is used to store the identified tendency of each bit of the SRAM block 102. The PUF controller 112 is configured to generate an initial PUF signature based on a powering-on request and further process the initial PUF signature to generate a new PUF signature based on the identified tendencies of the bits of SRAM block 102. The ECC circuit 114 is configured to further process the PUF signature by correcting any possible error(s). The operation of the authentication circuit 104 and functionality of each component of the authentication circuit 104 will be described in further detail below in conjunction with FIGS. 2, 3, 4, 5, and 6.

Figure 2:
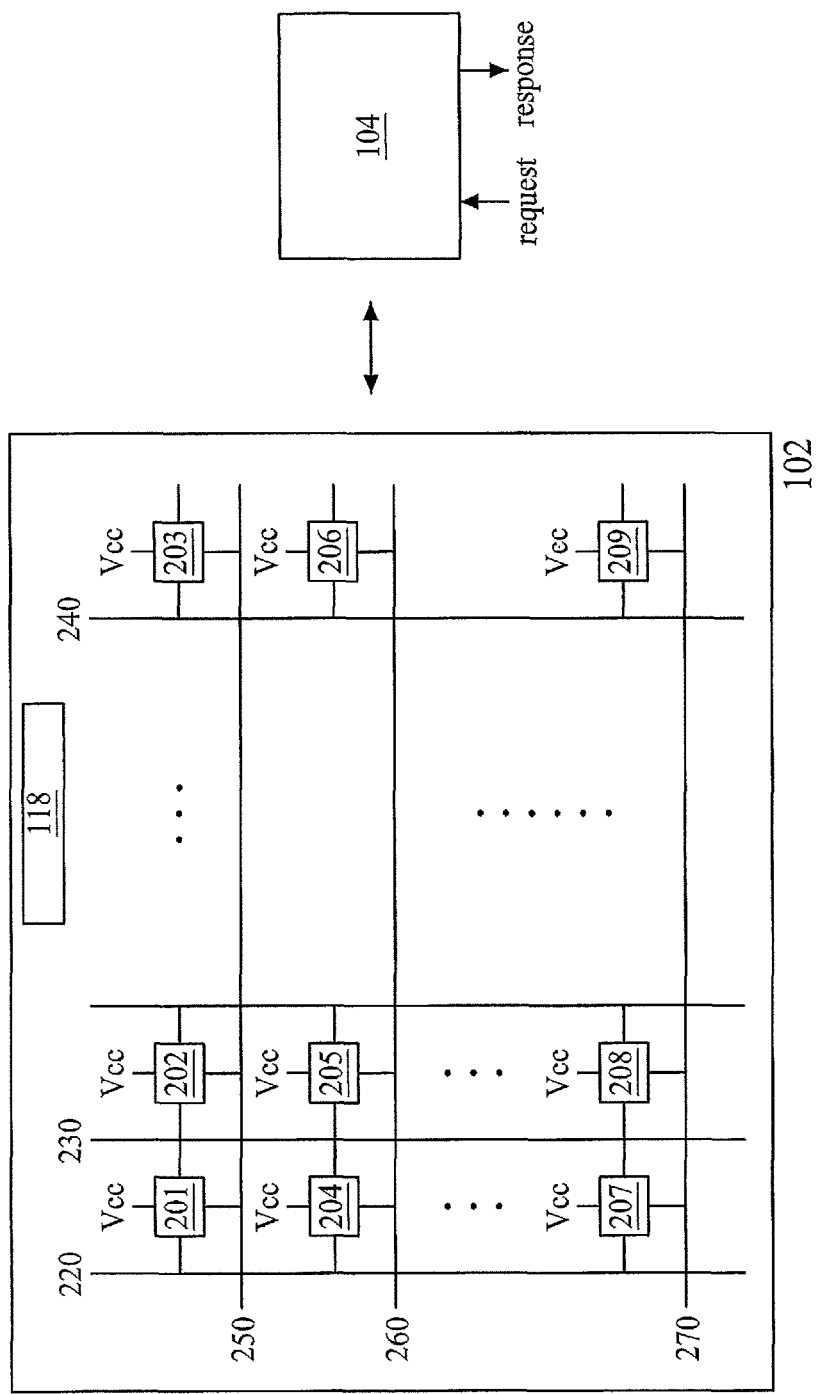
FIG. 2 illustrates an exemplary block diagram of a static random-access memory (SRAM) block of the memory device in FIG. 1 in accordance with some embodiments.

FIG. 2 illustrates an exemplary embodiment of the SRAM block 102. As illustrated, the SRAM block 102 includes a plurality of bits 201, 202, 203, 204, 205, 206, 207, 208, and up to 209, and a built-in voltage controller 118. For clarity, only 9 bits are shown in the illustrated embodiment of FIG. 2. Each bit may include a plurality of transistors (e.g., six MOSFETs for a 6T SRAM, eight MOSFETs for an 8T SRAM, etc.) to store data. In a particular embodiment, storing data in each bit may be implemented by applying either a high state (i.e., logical "1") or a low state (i.e., logical "0") by a corresponding word line (WL) and/or bit line (BL). In the illustrated embodiment of FIG. 2, the WL's/BL's of the SRAM block 102 include 220, 230, 240, 250, 260, and up to 270, and each bit is coupled to at least one of the WL's and BL's respectively. In an embodiment, lines 220, 230, and 240 may be word lines (WL's) and lines 256, 260, and 270 may be bit lines (BL's). In another embodiment, lines 220, 230, and 240 may be bit lines (BL's) and lines 256, 260, and 270 may be word lines (WL's). For example, the bit 201 may be applied to have a state of either 1 or 0 through the WL/BL 220/250; the bit 202 may be applied to have a state of either 1 or 0 through the WL/BL 230/250; the bit 203 may be applied to have a state of either 1 or 0 through the WL/BL 240/250; the bit 204 may be applied to have a state of either 1 or 0 through the WL/BL 260/220; the bit 205 may be applied to have a state of either 1 or 0 through the WL/BL 260/230; the bit 206 may be applied to have a state of either 1 or 0 through the WL/BL 260/240; the bit 207 may be applied to have a state of either 1 or 0 through the WL/BL 270/220; the bit 208 may be applied to have a state of either 1 or 0 through the WL/BL 270/230; the bit 209 may be applied to have a state of either 1 or 0 through the WL/BL 270/240. Further, as shown in FIG. 2, each of the bits of the SRAM block 102 is coupled to and powered by a supplied voltage, hereinafter "Vcc." In some embodiments, the built-in voltage controller 118 is configured to communicate with the voltage controller 106 of the authentication circuit 104, and based on the communication, to further control the supplied voltage Vcc.

In some embodiments, the authentication circuit 104 coupled to the SRAM block 102 may first receive a request (e.g., a request signal) through the input port 118. In the specific embodiment discussed below, the request is to power on the SRAM block 102. In some other embodiments, the request can be any of a variety of signals that is suitable to operate (or access) the SRAM block 102 through the authentication circuit 104 while remaining within the scope of the present disclosure. In response to the powering-on request, the SRAM block 102 is turned on through the voltage controller 106 and/or the built-in voltage controller 118. As discussed above, while the SRAM block 102 is ON, each of the bits (e.g., 201, 202, 203, 204, 205, 206, 207, 208, and up to 209) may have an initial state, that is, either 0 or 1.

The PUF controller 112 generates an initial PUF signature by using all of the bits in SRAM 102. More specifically, such an initial signature is generated according to the initial states of all of the bits in SRAM block 102. In an example, an SRAM block includes 8 bits. As a voltage supply (e.g., a power-on voltage) is provided to each of these 8 bits, each of the bits may exhibit a respective initial state, either 0 or 1, due to manufacturing variance on each of the bits. Accordingly, the SRAM block may have data states such as 01101010, which is the initial signature of the SRAM block. The monitoring engine 108 of the authentication circuit 104 then provides a first data pattern to all of the bits in the SRAM block 102. In accordance with the current embodiments, the first data pattern is different from the initial state. In some embodiments, the monitoring engine 108 uses the first data pattern to cause the WL's and BL's to write "1" on all of the bits. That is, each bit of the SRAM block 102 is at the high state "1." The voltage controller 106 of the authentication circuit 104 will then vary the supplied voltage Vcc. In one embodiment, the voltage controller 106 ramps down the supplied voltage Vcc below a threshold value (e.g., a retention voltage of the bits in SRAM block 102) through the built-in voltage controller 118 of the SRAM block 102 while the monitoring engine 108 continuously monitors a change of the state on each bit. More specifically, the monitoring engines 108 detects whether any of the bits transitions (i.e., "flips") from "1" to "0." If so (i.e., a bit flips from 1 to 0), the monitoring engine 108 may mark the bit as a "stable bit" and, in some embodiments, may record its corresponding location into the database 110, as discussed in further detail below in conjunction with FIGS. 3-6. If not (i.e., the bit remains at 1), the monitoring engine 108 may mark the bit as an "unstable bit" and, in some embodiments, may record its corresponding location into the database 110, as discussed in further detail below in conjunction with FIGS. 3-6. Although in the current embodiments, the monitoring engine 108 may record the locations of either the stable bits or the unstable bits in the database 110, the monitoring engine 108 may be configured to record both of the locations of the stable and unstable bits in the database 110 while remaining within the scope of the present disclosure.

Continuing with the description of the operation of the authentication circuit 104, the monitoring engine 108 may further use a second data pattern to cause the WL's and BL's of the SRAM block 102 to write a "0" on all of the bits of the SRAM block 102. That is, each bit of the SRAM block 102 is programmed to have a low state "0." As discussed above, the voltage controller 106 ramps down the supplied voltage Vcc below the threshold through the built-in voltage controller in the SRAM block 102 while the monitoring engine 108 continuously monitors a change of state on each bit. In other words, the monitoring engine 108 detects whether any of the bits transition (i.e., "flips") from "0" to "1." If so (i.e., a bit flips from 0 to 1), the monitoring engine 108 may mark the bit as a "stable bit" and, in some embodiments, may record its corresponding location into the database 110. If not (i.e., the bit remains at 0), the monitoring engine 108 may mark the bit as an "unstable bit" and, in some further embodiments, may record its corresponding location into the database 110.

Although in some embodiments, the monitoring engine 108 may record the locations of either the stable bits or the unstable bits in the database 110, the monitoring engine 108 may be configured to record both of the locations of the stable and unstable bits in the database 110 while remaining within the scope of the present disclosure. In the embodiments discussed above, the monitoring engine 108 is configured to provide the first data pattern that causes all the bits to transition to the high state, "1," before the voltage controller 106 ramps down Vcc for the monitoring engine 108 to perform the first monitoring (hereinafter the "first test") then provide the second data pattern that causes all the bits to transition to the low state, "0," before the voltage controller 106 ramps down Vcc again for monitoring engine 108 to perform the second monitoring (hereinafter the "second test"). However, in some other embodiments, the first data pattern provided by the monitoring engine 108 may cause all the bits to transition to "0" before the first test and the second data pattern may cause all the bits to transition to "1" before the second test. In some embodiments, a bit may transition both from 1 to 0 and from 0 to 1 during both the first and second tests. In this case, the monitor engine 108 may mark such a bit as an "unstable bit." For example, if a bit transitions from 1 to 0 during the first test and subsequently during the second test, the bit transitions from 0 to 1 as well, the bit may be marked by the monitoring engine 108 as an unstable bit. Although, in some embodiments, both of the first and second tests are used to determine a tendency of a bit (i.e., either stable or unstable), in some alternative embodiments, either the first or second test is used to determine the tendency of each bit while remaining within the scope of the present disclosure.

After the tendency (i.e., either stable or unstable) of each bit is detected/marked by the monitoring engine 108, in some embodiments, the PUF controller 112 of the authentication circuit 104 may only use the stable bits to generate a second PUF signature. In some embodiments, the PUF controller 112 may generate the second PUF signature by further processing the initial PUF signature. For example, as described above, the initial PUF signature can include the power-on state for each of the bits of the SRAM block 102 (regardless of whether a bit is stable or unstable). After the monitoring engine 108 identifies the tendency of each bit, the PUF controller 112 may access the initial PUF signature and process the initial PUF signature by filtering out the unstable bit(s) to generate the second PUF signature. In some embodiments, the PUF controller 112 may access the initial PUF signature and exclude using the initial state(s) of the identified unstable bit(s) to generate the second PUF signature. Accordingly, the second signature is generated based on the power-on states (i.e., the initial states) of the "stable" bits, instead all of the bits that includes both stable and unstable bits. As such, the second signature may be more reliable since the stable bits are the bits that pass the test (either the first test or the second test) and thus may be shown as having a strong tendency (either to 1 or 0). Moreover, as will be described below, after the tendency of each bit is marked (identified), the PUF controller 112 may circumvent accessing the SRAM block 102 again (which may cause issues such as power consumption, reliability, transmission error, among others). Instead, the PUF controller 112 may access the database 110 to use the stable bits to generate the second signature, or in some alternative embodiments, to identify the unstable bits and use the identified unstable bits to further process (e.g., filter) the initial signature thereby generating the second signature.

After prolonged use and aging of the SRAM block 102, one or more SRAM bits may change their tendency. To address this issue, in some embodiments, the monitoring engine 108 of the authentication circuit 104 may periodically monitor the tendency of each bit to provide a most updated tendency for each SRAM bit. Based on the most updated monitored tendency, the PUF controller 112 may periodically provide an updated signature and thus dynamically update the PUF signature.

Figure 3:
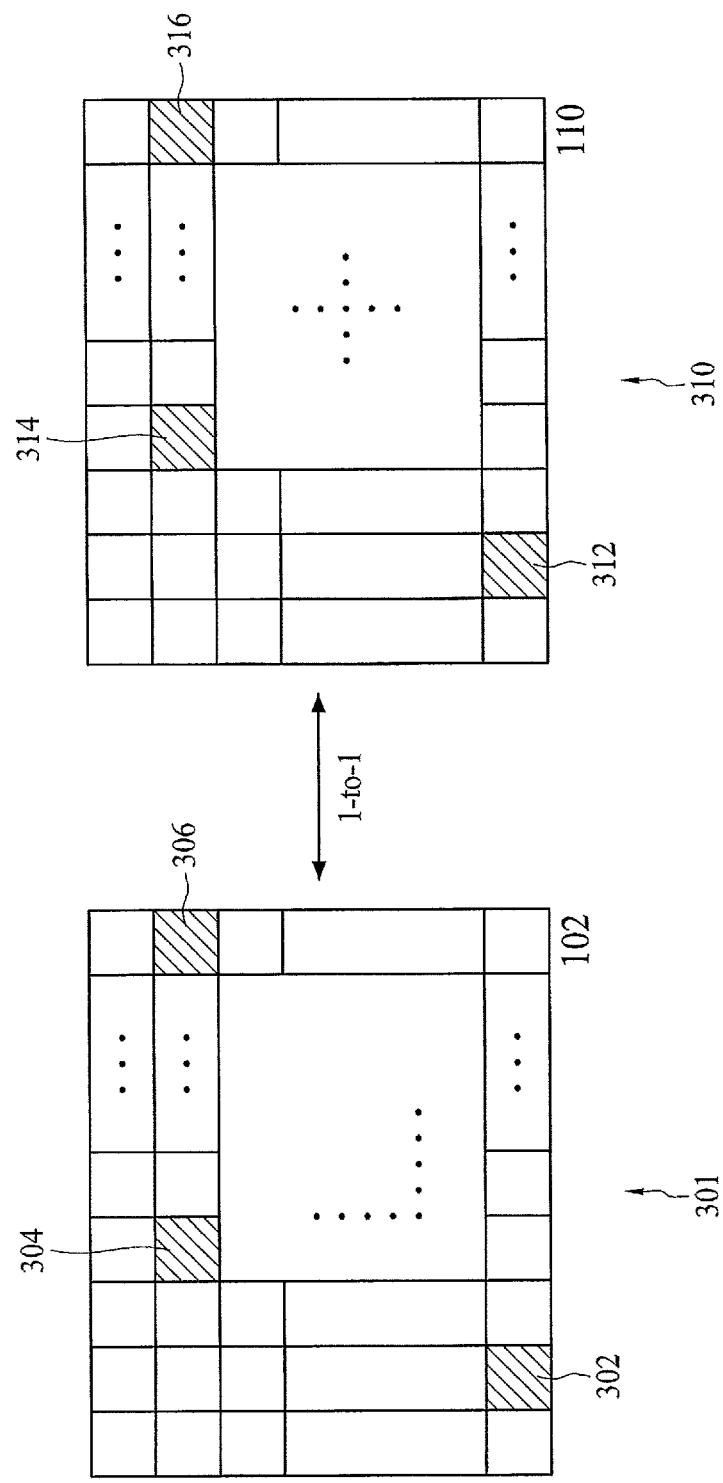
FIG. 3 illustrates an exemplary diagram of a database of the memory device in FIG. 1 in accordance with some embodiments.

FIG. 3 shows an exemplary embodiment in which locations of the stable/unstable bits are stored in the database 110 of the authentication circuit 104. In the above discussion, in some embodiments, the monitoring engine 108 may store the identified tendency of each bit in the database 110. In the specific embodiment of FIG. 3, the database 110 includes an NVM and the NVM includes an array of NVM bits 310 to which a bit array 301 of the SRAM block 102 is one-to-one mapped. In particular, each bit (e.g., 302, 304, and 306) in the SRAM block 102 corresponds to an NVM bit (e.g., 312, 314, and 316) of the array 310 with an identical location and its identified tendency. For example, NVM bit 312 of the database 110 is mapped from the bit 302 of the SRAM block 102 with an identified tendency (i.e., either stable or unstable, as described above). Both of the bit 302 and the NVM bit 312 are located in the same location of their respective array; NVM bit 314 of the database 110 is mapped from the bit 304 of the SRAM block 102 with an identified tendency (either stable or unstable); NVM bit 316 of the database 110 is mapped from the bit 306 of the SRAM block 102 with an identified tendency (either stable or unstable). As such, the PUF generator 112 may directly access the database 110 to filter out unstable bits to generate the second signature, as discussed above. In some embodiments, the ECC circuit 114 may further process the second signature to filter out more unstable bit(s) that are not marked by the monitoring engine 108 and/or correct some errors due to a variety of conditions (e.g., environmental temperature, voltage fluctuation, etc.) before the authentication circuit 104 outputs the second signature.

In some embodiments, given a large number of stable/unstable bits (e.g., more than a thousand unstable bits in a 4096-bit SRAM block), the monitoring engine 108 may not store the tendency of all the SRAM bits in the database 110 by bits. Instead, the monitoring engine 108 may mark a column and/or a row of NVM bits as an "unstable column/row" whenever such an unstable column/row includes at least one unstable bit, and store the unstable column/row in the database 110 by column/row.

Figure 4:
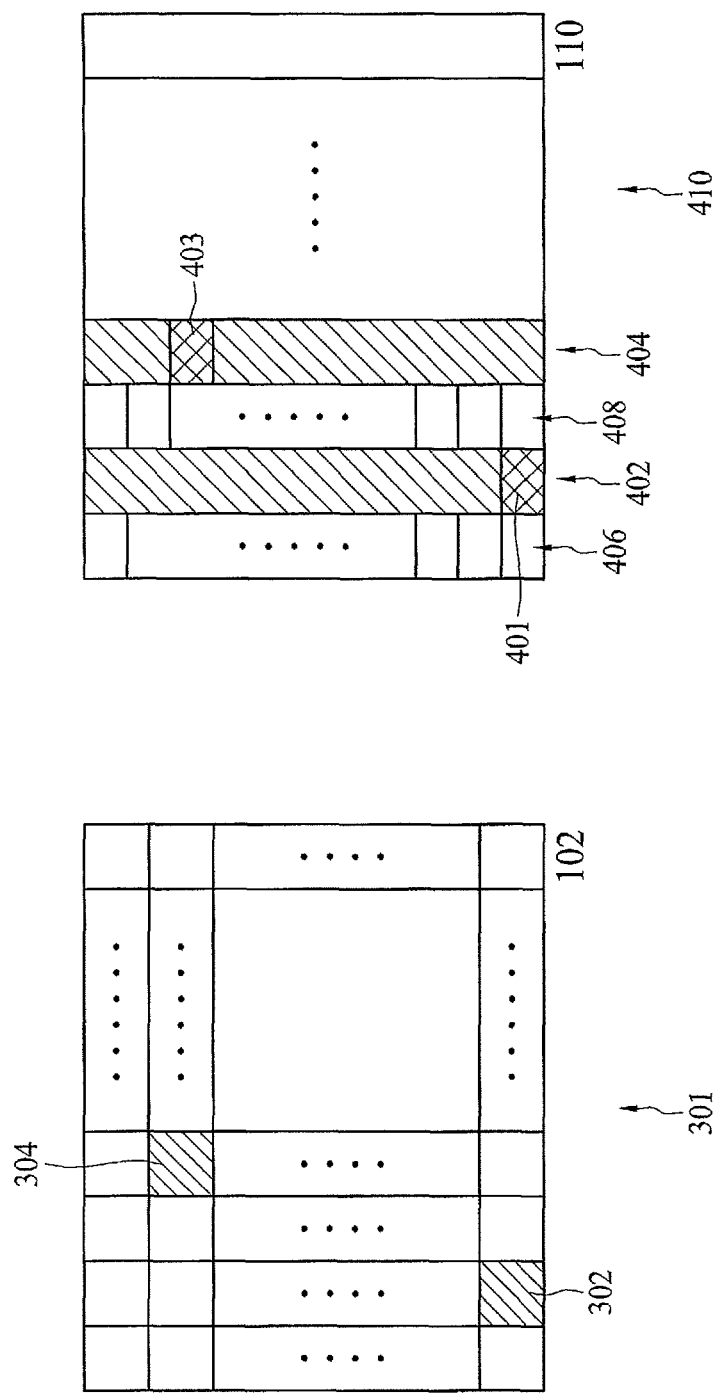
FIG. 4 illustrates an exemplary diagram of a database of the memory device in FIG. 1 in accordance with some embodiments.

FIG. 4 shows an exemplary embodiment in which the unstable columns are stored in the database 110 of the authentication circuit 104. Using the same example provided in FIG. 3, the array 301 includes two unstable bits 302 and 304 identified by the monitoring engine 108. Based on a mapping from the SRAM bits to the NVM bits, the monitoring engine 108 may mark the whole column of NVM bits that includes the unstable bit(s) as an unstable column. As illustrated in FIG. 4, an array of NVM bits 410 of the database 110 is divided into multiple columns, with columns 402 and 404 identified by the monitoring engine 108 as unstable columns since the column 402 includes an unstable bit 401 (mapped from the SRAM bit 302) and column 404 includes another unstable bit 403 (mapped from the SRAM bit 304).

Figure 5:
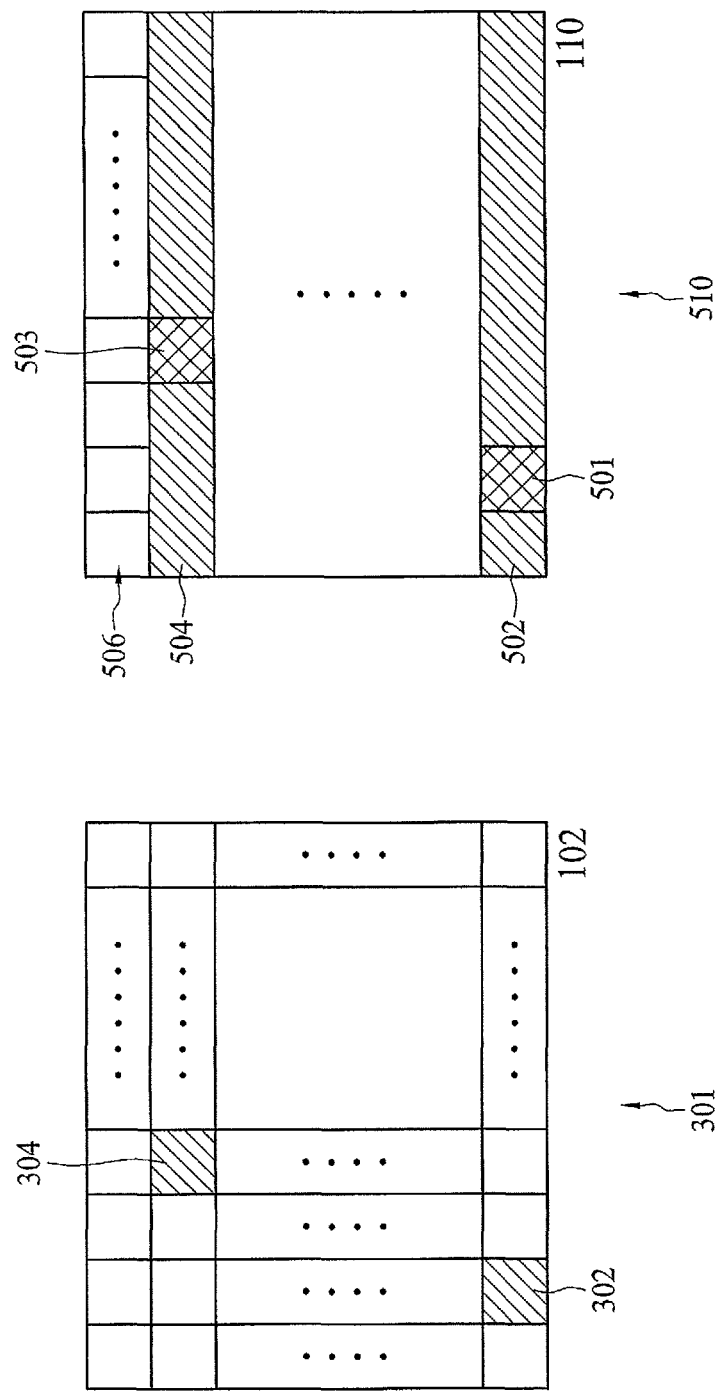
FIG. 5 illustrates an exemplary diagram of a database of the memory device in FIG. 1 in accordance with some embodiments.

FIG. 5 shows an exemplary embodiment in which unstable rows are stored in the database 110 of the authentication circuit 104. Using the same example provided in FIGS. 3 and 4, the array 301 includes two unstable bits 302 and 304 identified by the monitoring engine 108. Based on a mapping from the SRAM bits to the NVM bits, the monitoring engine 108 may mark the whole row that includes the unstable bit(s) as an unstable row. As illustrated in FIG. 5, an array of NVM bits 510 of the database 110 is divided into multiple rows, with rows 502 and 504 identified by the monitoring engine 108 as the unstable rows since row 502 includes an unstable bit 501 (mapped from the SRAM bit 302) and row 504 includes another unstable bit 503 (mapped from the SRAM bit 304). Then, the PUF controller 112 may use the NVM bits (e.g., from array 410 and/or 510) that are not included in the identified unstable column(s) and row(s) (e.g., 406, 408, 506) to generate the second signature. That is, the PUF controller 112 may filter out the unstable column(s)/row(s) for generating the second signature.

Figure 6:
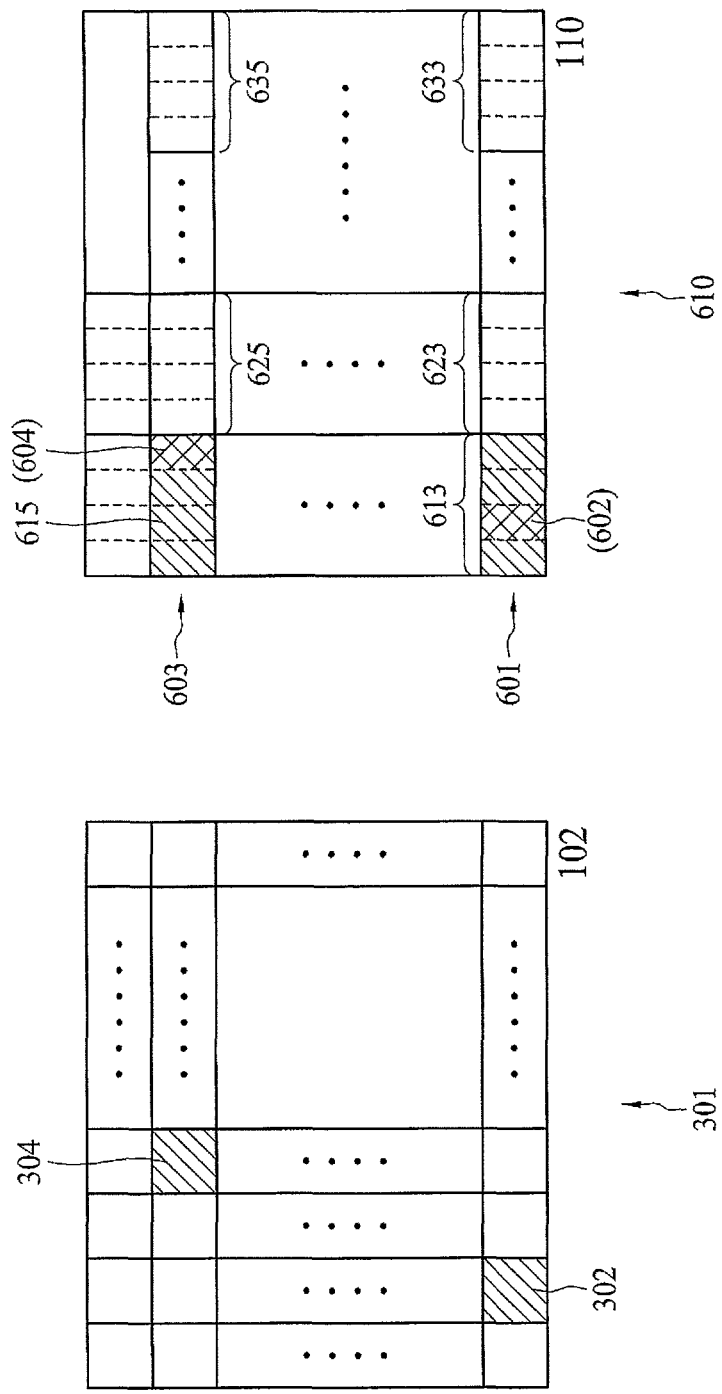
FIG. 6 illustrates an exemplary diagram of a database of the memory device in FIG. 1 in accordance with some embodiments.

FIG. 6 shows an exemplary embodiment in which stable/unstable segments are stored in the database 110 of the authentication circuit 104. In some embodiments, the monitoring engine 108 may divide a column/row of NVM bits into a plurality of segments, mark a segment of the column/row as an "unstable column/row segment" whenever such an unstable column/row segment includes at least an unstable bit, and store the unstable column/row segment in the database 110 by column/row segment. In the illustrated embodiment of FIG. 6 (still using the same example above), an array of NVM bits 610 of the database 110 may be first divided by row, and each row is divided into a plurality of row segments wherein each row segment is equally sized to have 4 NVM bits. As such, row 603 includes row segments 615, 625, and up to 635; row 601 includes row segments 613, 623, and up to 633. Since row segment 615 includes the unstable bit 604 mapped from the SRAM bit 304 and row segment 613 includes the unstable bit 602 mapped from the SRAM bit 302, row segments 613 and 615 may be marked by the monitoring engine 108 as unstable row segments. Consequently, the PUF controller 112 may use the NVM bits in the array 610 that are not included in the unstable row segments, such as row segments 625, 635, 623, 633, etc., to generate the second signature. That is, the PUF controller 112 may filter out the unstable row segment(s) for generating the second signature. Similarly, an unstable column segment may be stored in the array 610 and used (filtered out) by the PUF controller 112 in a similar fashion. In accordance with various embodiments, each row/column segment may have any number of NVM bits such as, for example, 2, 3, 5, etc. while remaining within the scope of the present disclosure.

Figure 7:
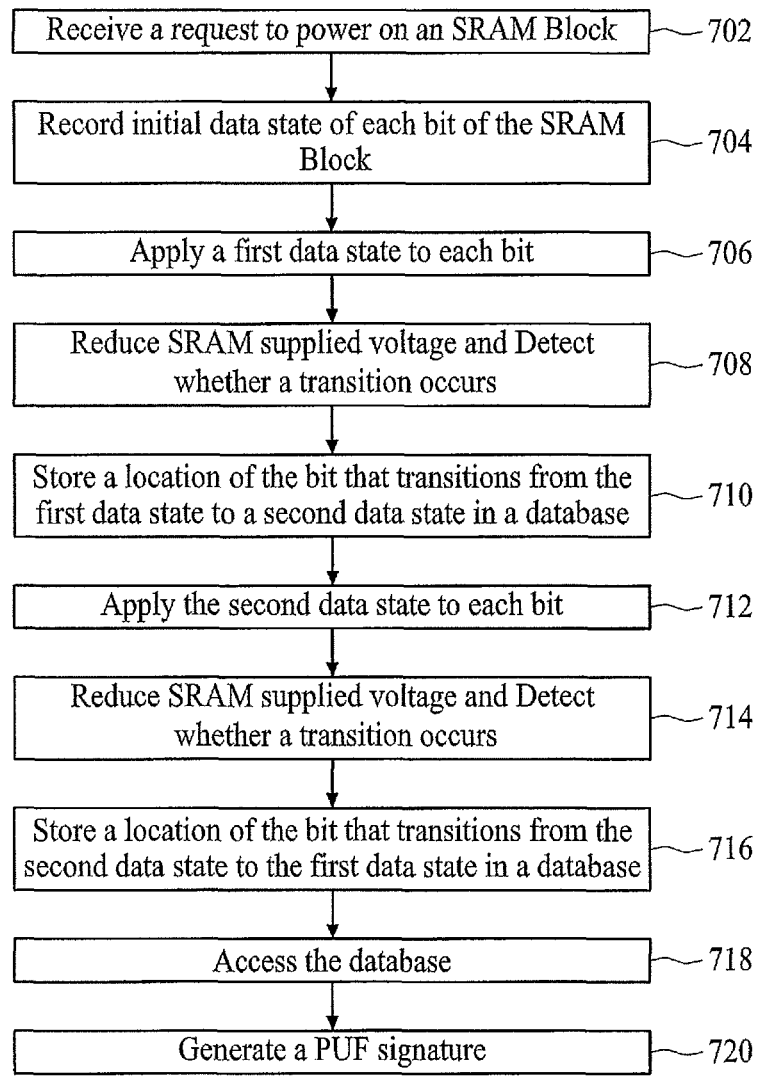
FIG. 7 illustrates an exemplary flow chart of a method of generating a physically unclonable function (PUF) signature for the SRAM block of FIG. 1 in accordance with various embodiments.

FIG. 7 illustrates an exemplary flow chart of a method 700 of generating a physically unclonable function (PUF) signature, by the authentication circuit 104, for the SRAM block 102 in accordance with some embodiments. In various embodiments, the method 700 is performed by at least one of the components described in FIGS. 1-6. For purposes of discussion, the following embodiment of the method 700 will be described in conjunction with FIGS. 1-6. The illustrated embodiment of the method 700 is merely an example so that any of a variety of operations may be omitted, re-sequenced, and/or added while remaining within the scope of the present disclosure.

The method 700 starts with operation 702 in which the authentication circuit 104 receives the request through the input port 124 to power on the SRAM block 102. In response to the request, the SRAM block 102 is turned on through the voltage controller 106 and/or the built-in voltage controller 118 in accordance with some embodiments. The method 700 continues to operation 704 in which the PUF controller 112 records the initials states of all the bits of the SRAM block 102. As discussed above, while the SRAM block 102 is powered on, each of the bits of the SRAM block 102 may have an initial state, that is, either 0 or 1. The PUF controller 112 then generates an initial PUF signature by using the initial states of all of the bits in SRAM 102.

The method 700 continues to operation 706 in which the monitoring engine 108 provides a first data pattern to all the bits of the SRAM block 102. In some embodiments, as discussed above, the first data pattern may cause the WL's and BL's (220, 230, 240, 250, 260, and 270) of the SRAM block 102 to write/apply a high state (i.e., logical "1") to each of the bits of the SRAM block 102. The method 700 then continues to operation 708 in which the voltage controller 106 ramps down the supplied voltage Vcc through the built-in voltage controller 108 and while the supplied voltage Vcc is reducing, the monitoring engine 108 concurrently detects whether a transition of state on a bit occurs. In the example that each bit is applied to have a logical 1, the monitoring engine 108 detects which bit transitions from 1 to 0 (i.e., the first test as discussed above). In accordance with some embodiments of the present disclosure, if the monitoring engine 108 detects that a bit transitions from 1 to 0 with the reducing supplied voltage (i.e., a transition occurs), the monitoring engine 108 may identify such a bit as a stable bit; if the monitoring engine 108 detects that a bit does not transition from 1 to 0 with the reducing supplied voltage (i.e., a transition does not occur), the monitoring engine 108 may identify such a bit as an unstable bit.

Referring still to FIG. 7, the method 700 continues to operation 710 in which the monitoring engine 108 stores the location(s) of the stable bit(s) in the, database 110. However, in some other embodiments, during the operation 710, the monitoring engine 108 may store the location(s) of the unstable bit(s) in the database 110. The monitoring engine 108 may choose to store the location(s) of either the stable bit(s) or the unstable bit(s) in the database 110 using the one-to-one mapping from the bit array 301 of SRAM block 102 to the NVM bit array 310 of the database 110, as discussed in FIG. 3.

The method 700 continues to operation 712 in which the monitoring engine 108 provides a second data pattern to all the bits of the SRAM block 102. The second data pattern may cause the WL's and BL's (220, 230, 240, 250, 260, and 270) of the SRAM block 102 to write/apply a low state (i.e., logical "0") to each of the bits of the SRAM block 102. The method 700 then continues to operation 714 in which the voltage controller 106 ramps down the supplied voltage Vcc through the built-in voltage controller 108 and while the supplied voltage Vcc is reducing, the monitoring engine 108 detects whether a transition of state on each bit occurs. In some embodiments, the second data pattern is different from the first data pattern and thus may be referred to as the second test, as described above. In the example that each bit is applied to have a logical 0, the monitoring engine 108 detects which bit transitions from 0 to 1. In accordance with some embodiments of the present disclosure, if the monitoring engine 108 detects that a bit transitions from 0 to 1 with the reducing supplied voltage (i.e., a transition occurs), the monitoring engine 108 may identify such a bit as a stable bit; if the monitoring engine 108 detects that a bit does not transition from 0 to 1 with the reducing supplied voltage (i.e., a transition does not occur), the monitoring engine 108 may identify such a bit as an unstable bit.

Referring still to FIG. 7, the method 700 continues to operation 716 in which the monitoring engine 108 stores the location(s) of the stable bit(s) in the database 110. However, in some other embodiments, during the operation 710, the monitoring engine 108 may store the location(s) of the unstable bit(s) in the database 110. The monitoring engine 108 may choose to store the location(s) of either the stable bit(s) or the unstable bit(s) in the database 110 using the one-to-one mapping from the bit array 301 of SRAM block 102 to the NVM bit array 310 of the database 110, as discussed in FIG. 3.

In summary, the tendency (i.e., either stable or unstable) of each bit of the SRAM block 102 is identified by the monitoring engine 108 through the first and second tests (i.e., operations 708 and 714). In some embodiments, such an identified tendency is stored in the database 110 with a single NVM bit location identically mapped from the bit of SRAM block 102, as discussed in FIG. 3. As such, the tendency of each bit in the SRAM block 102 is identified by the mapped NVM bit array 310 of the database 110. In some other embodiments as discussed in FIGS. 4 and 5, one or more unstable columns/rows may be identified and stored in the database 110. As such, the unstable column/row in the SRAM block 102 may be identified by the mapped NVM column/row location (e.g., columns 402 and 404, and rows 502 and 504). Yet in some other embodiments as discussed in FIG. 6, one or more unstable column/row segments may be identified and stored in the database 110. As such, the unstable column/row segments in the SRAM block 102 may be identified by the mapped NVM column/row segment location (e.g., unstable row segments 613 and 615).

Referring back to FIG. 7, the method 700 continues to operation 718 in which the PUF controller 112 accesses the database 110 to use only the stable bit(s), the stable column(s), the stable row(s), the stable column segment(s), or the stable row segment(s) to generate the PUF signature (i.e., operation 720).

In the example where the stable or unstable bit of the SRAM block 102 is identified by the mapped NVM bit location in the database 110, in operation 720, the PUF controller 112 may use the identified tendencies stored in the mapped database 110 to filter out the unstable bit(s) in the SRAM block 102 so that only the stable bit(s) in the SRAM block 102 are used to generate the PUF signature. More specifically in operation 720, the PUF controller 112 uses the initial state(s) (recorded in operation 704) of the stable bit(s) only in the SRAM block 102 to generate the PUF signature. That is, the initial state(s) of the unstable bit(s), which are originally used to generate the initial PUF signature, are filtered out and/or excluded by the PUF controller 112 to generate the PUF signature.

In the example where the stable or unstable column/row of the SRAM block 102 is identified by the mapped NVM column/row location in the database 110, in operation 720, the PUF controller 112 may use the identified tendency of column or row to filter out and/or exclude the unstable column or row in the SRAM block 102 so that only the bits of the stable column or row in the SRAM block 102 are used to generate the PUF signature. More specifically in operation 720, the PUF controller 112 only uses the initial states (recorded in operation 704) of the bits of the stable column or row in the SRAM block 102 to generate the PUF signature.

In the example where the stable or unstable column/row segment of the SRAM block 102 is identified by the mapped NVM column/row segment location in the database 110, in operation 720, the PUF controller 112 may use the identified tendency of column or row segment to filter out and/or exclude the unstable column or row segment in the SRAM block 102 so that only the bits of the stable column or row segment in the SRAM block 102 are used to generate the PUF signature. More specifically in operation 720, the PUF controller 112 only uses the initial states (recorded in operation 704) of the bits of the stable column or row segment in the SRAM block 102 to generate the PUF signature.

In an embodiment, an authentication circuit is disclosed. The authentication circuit is coupled to a memory device that includes a plurality of bits. The authentication circuit includes a monitoring engine, coupled to the plurality of bits of the memory device, and configured to provide a first data pattern to the plurality of bits thereby causing each of the plurality of bits to be in a first data state, detect whether a transition from the first data state to a second data state occurs for each bit in response to a first reducing voltage applied to the plurality of bits, provide a second data pattern to the plurality of bits thereby causing each of the plurality of bits to be in the second data state, and detect whether a transition from the second data state to the first data state occurs for each bit in response to a second reducing voltage applied to the plurality of bits, wherein the first data state is different from the second data state, and a physically unclonable function (PUF) controller, coupled to the plurality of bits of the memory device and the monitoring engine, and configured to generate a PUF signature based on the transitions of each bit.

In another embodiment, a memory device includes a static random-access memory (SRAM) block that includes an array of bits, and an authentication circuit coupled to the SRAM block. The authentication circuit includes a monitoring engine, coupled to the array of bits, and configured to provide a first data pattern to the array of bits thereby causing each of the bits to be in a first data state, detect whether a transition from the first data state to a second data state occurs for each bit in response to a first reducing voltage applied to the array of bits, provide a second data pattern to the array of bits thereby causing each of the bits to be in the second data state, and detect whether a transition from the second data state to the first data state occurs for each bit in response to a second reducing voltage applied to the plurality of bits, the first data state being different from the second data state, and a physically unclonable function (PUF) controller, coupled to the array of bits and the monitoring engine, and configured to generate a PUF signature based on the transitions of each bit.

Yet in another embodiment, a method of generating a physically unclonable function (PUF) signature for a memory array that includes a plurality of bits is disclosed. The method includes powering on the memory device and recording an initial data state of each of the plurality of bits; causing each of the plurality of bits to be in a first data state by applying a first data pattern to the plurality of bits; detecting whether each bit transitions from the first data state to a second data state in response to reducing a voltage applied to the plurality of bits; if the transition from the first to second data state for a bit is detected, identifying the bit as a first stable bit; causing each of the plurality of bits to be in the second data state by applying a second data pattern to the plurality of data bits, wherein the second data state is different from the first data state; detecting whether each bit transitions from the second data state to the first data state in response to reducing a voltage applied to the plurality of bits; if the transition from the second to the first data state for a bit is detected, identifying the bit as a second stable bit; and based on the initial data state of the stable bits, generating the PUF signature.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claims is:

1. An authentication circuit coupled to a memory device that includes a plurality of bits, the authentication circuit comprising:
   a first circuit, coupled to the plurality of bits of the memory device, and configured to cause each of the plurality of bits to be in a first data state, detect whether a transition from the first data state to a second data state occurs for each bit in response to a first reducing voltage applied to the plurality of bits; and
   a second circuit, coupled to the plurality of bits of the memory device and the first circuit, and configured to generate an initial physically unclonable function (PUF) signature based on an initial power-on data state of each of the plurality of bits and a new PUF signature based on the transitions of each bit and the initial PUF signature.

2. The authentication circuit of claim 1 further comprising:
   a voltage controller, coupled to the memory device and the monitoring engine, that is configured to vary voltage applied to the plurality of bits.

3. The authentication circuit of claim 1 wherein the second circuit is configured to receive a request to power on the memory device and record the initial power-on data state of each of the plurality of bits before the first circuit provides the first and second data patterns to the plurality of bits.

4. The authentication circuit of claim 3 wherein if the first circuit detects either the transition from the first data state to the second data state or the transition from the second data state to the first data state for a bit, the first circuit identifies the bit to the second circuit thereby enabling the second circuit to selectively use the initial data state of the identified bit to generate the new PUF signature.

5. The authentication circuit of claim 4 wherein the first circuit is further configured to store a location of the identified bit in a database coupled to the second circuit.

6. The authentication circuit of claim 3, wherein if the first circuit detects both the transition from the first data state to the second data state and the transition from the second data state to the first data state for a bit, the first circuit identifies the bit to the second circuit thereby enabling the second circuit to exclude using the initial data state of the identified bit to generate the new PUF signature.

7. The authentication circuit of claim 1 wherein the reducing voltage is applied below a retention voltage of the memory device.

8. A memory device comprising:
   an authentication circuit coupled to a plurality of bits, comprising:
   a first circuit, coupled to the plurality of bits, and configured to detect whether a transition from a first data state to a second data state occurs for each bit in response to a first reducing voltage applied to the plurality of bits;
   a second circuit, coupled to the plurality of bits and the first circuit, and configured to generate an initial physically unclonable function (PUF) signature based on an initial power-on data state of each of the plurality of bits and a new PUF signature based on the transitions of each bit and the initial PUF signature.

9. The memory device of claim 8 wherein the first circuit is further configured to provide a first data pattern to the plurality of bits thereby causing each of the bits to be in the first data state.

10. The memory device of claim 9 wherein the first circuit is further configured to provide a second data pattern to the plurality of bits thereby causing each of the bits to be in the second data state, and detect whether a transition from the second data state to the first data state occurs for each bit in response to a second reducing voltage applied to the plurality of bits, the first data state being different from the second data state.

11. The memory device of claim 10 wherein the authentication circuit further comprises a voltage controller, coupled to the plurality of bits and the first circuit, that is configured to provide the first and second reducing voltages.

12. The memory device of claim 10 wherein the second circuit is configured to receive a request to power on the plurality of bits and record the initial power-on data state of each of the plurality of bits before the first circuit provides the first and second data patterns to the plurality of bits.

13. The memory device of claim 12 wherein if the first circuit detects either the transition from the first data state to the second data state or the transition from the second data state to the first data state for a bit, the first circuit identifies the bit to the second circuit thereby enabling the second circuit to selectively use the initial power-on data state of the identified bit to generate the new PUF signature.

14. The memory device of claim 12 wherein if the first circuit does not detect the transition from the first data state to the second data state or the transition from the second data state to the first state for a bit, the first circuit identifies the bit to the second circuit thereby causing the second circuit to exclude using the initial power-on data state of the identified bit to generate the new PUF signature.

15. The memory device of claim 12 wherein if the first circuit does not detect the transition from the first data state to the second data state or the transition from the second data state to the first state for a bit, the first circuit identifies either a column or a row of the plurality of bits that includes such a bit to the second circuit thereby causing the second circuit to exclude using the initial power-on data states of the identified column or row of the plurality of bits to generate the new PUF signature.

16. The memory device of claim 12 wherein if the first circuit does not detect the transition from the first data state to the second data state or the transition from the second data state to the first state for a bit, the first circuit identifies either a column segment or a row segment of the plurality of bits that includes such a bit to the second circuit thereby causing the second circuit to exclude using the initial power-on data states of the identified column segment or row segment of the plurality of bits to generate the new PUF signature.

17. A method of generating a physically unclonable function (PUF) signature for a memory array that includes a plurality of bits, the method comprising:

powering on the memory device and recording an initial data state of each of the plurality of bits to generate an initial PUF signature;

causing each of the plurality of bits to be in a first data state by applying a first data pattern to the plurality of bits;

detecting whether each bit transitions from the first data state to a second data state in response to changing a voltage applied to the plurality of bits;

if the transition from the first to second data state for a bit is detected, identifying the bit as a first stable bit;

causing each of the plurality of bits to be in the second data state by applying a second data pattern to the plurality of data bits, wherein the second data state is different from the first data state;

detecting whether each bit transitions from the second data state to the first data state in response to changing a voltage applied to the plurality of bits;

if the transition from the second to the first data state for a bit is detected, identifying the bit as a second stable bit; and based on the transitions of the first and second stable bits, updating the initial PUF signature to generate a new PUF signature.

18. The method of claim 17 further comprising:
storing a location of the stable bit in a database;
accessing the database; and
based on the location, using the initial data state of the stable bit to update the initial PUF signature so as to generate the new PUF signature.

19. The method of claim 17 further comprising:
storing either a column or a row location of the array in a database, wherein the column or row location includes at least a bit that lacks the transition from the first data state to the second data state and/or the transition from the second data state to the first data state;
accessing the database; and
based on the column or row location, excluding use of the initial data states of the bits in the column or row location to generate the new PUF signature.

20. The method of claim 17 further comprising:
storing either a column segment or a row segment location of the array in a database, wherein the column segment or row segment location includes at least a bit that lacks the transition from the first data state to the second data state and/or the transition from the second data state to the first data state;
accessing the database; and
based on the column segment or row segment location, excluding use of the initial data states of the bits in the column segment or row segment location to generate the new PUF signature.

* * * * *